(No Model.) 3 Sheets—Sheet 1.
J. P. PUTNAM.
WATER CLOSET AND SUPPLY TANK THEREFOR.
No. 440,197. Patented Nov. 11, 1890.
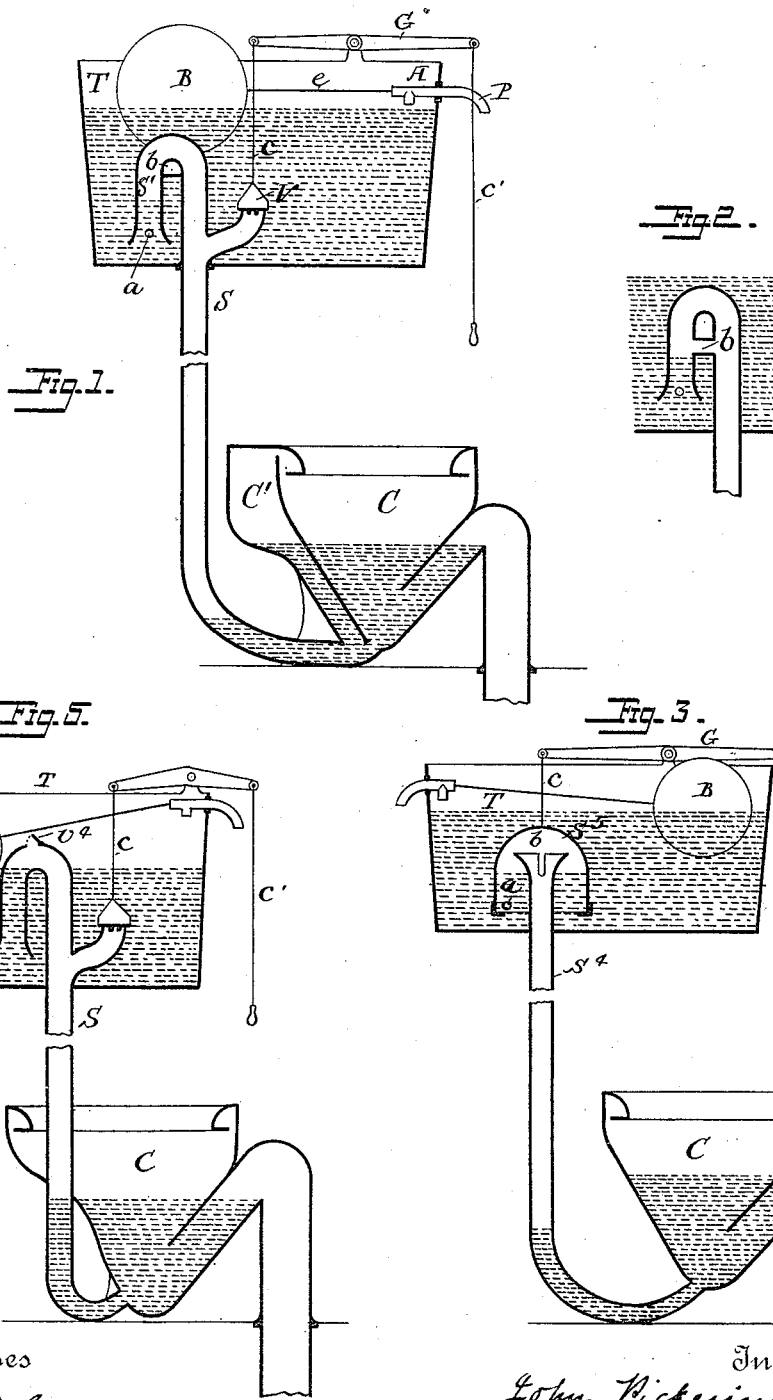

(No Model.) 3 Sheets—Sheet 3.

J. P. PUTNAM.
WATER CLOSET AND SUPPLY TANK THEREFOR.

No. 440,197. Patented Nov. 11, 1890.

Witnesses
Wm. F. Rogers
Edw. B. Stratton.

Inventor.
J. Pickering Putnam.

THE NORRIS PETERS CO., PHOTO-LITHO., WASHINGTON, D. C.

UNITED STATES PATENT OFFICE.

JOHN PICKERING PUTNAM, OF BOSTON, MASSACHUSETTS.

WATER-CLOSET AND SUPPLY-TANK THEREFOR.

SPECIFICATION forming part of Letters Patent No. 440,197, dated November 11, 1890.

Application filed August 3, 1888. Serial No. 281,919. (No model.)

*To all whom it may concern:*

Be it known that I, JOHN PICKERING PUTNAM, of Boston, Massachusetts, have invented an Improvement in Jet-Trap Water-Closets and Supply-Tanks Therefor, of which the following is a specification.

The invention consists in a jet-trap water-closet provided with a supply-cistern and connected therewith by a siphon, the end of the short arm of which is near the bottom of the cistern, and provided at its crown with an air-relief, while the long arm bends and enters the trap of the closet at the bottom of the trap, and its lower end bends upward in the direction of the upcast limb of the trap, so that a column of water filling the siphon and descending through the long arm thereof in the flushing operation will have sufficient power as a jet to set in motion and carry the contents of the trap over the overflow.

The invention consists, further, in certain details and modifications of construction.

Some of the details described and claimed are applicable to trapped closets not operated upon the principle of the jet.

Figure 4:
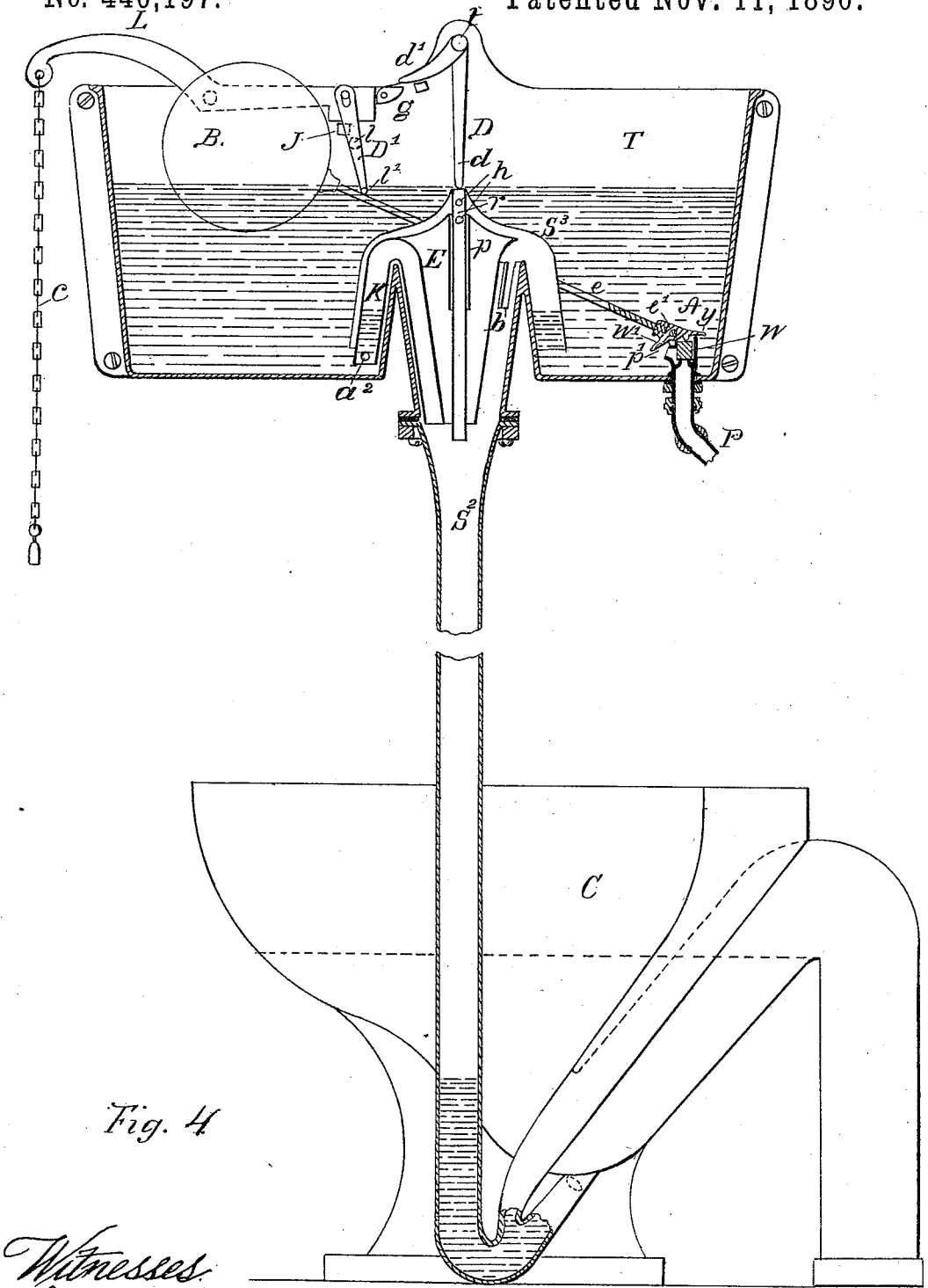
Figure 6:
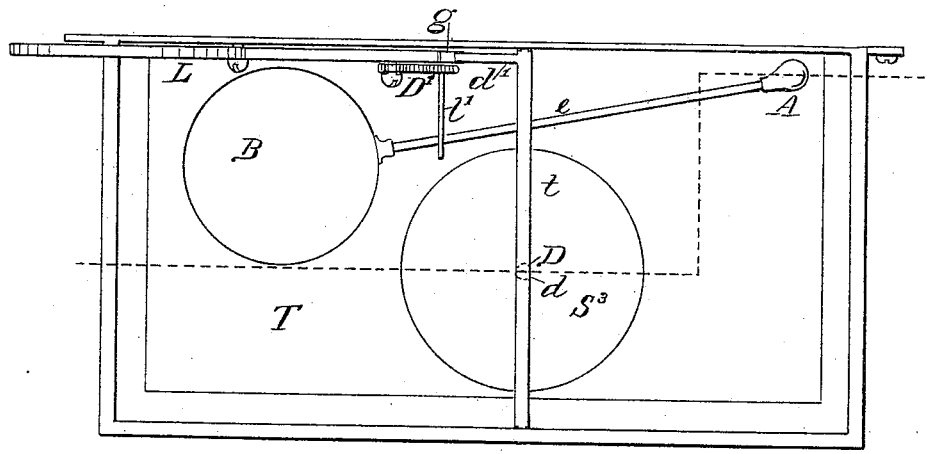
Figure 7:
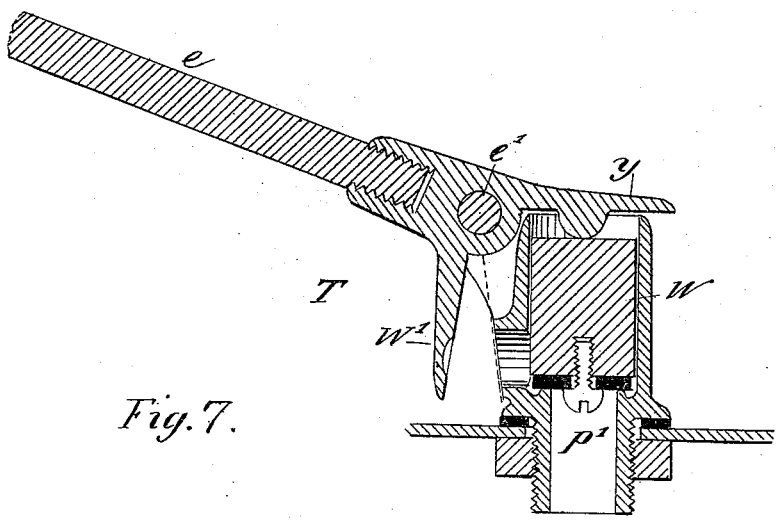

In the drawings, Figure 1 is a diagram illustrative of the principle of my said invention. Figs. 2 and 3 show modifications in details of construction. Fig. 4 is a sectional elevation of apparatus embodying my invention as a whole in its best working form. Fig. 5 is a modification relative to provision for establishing a solid column of water between the cistern and closet. Fig. 6 is a plan of the cistern shown at Fig. 4. Fig. 7 is an enlarged sectional view of valve mechanism shown in Fig. 4.

So far as they may be the same letters are used in the diagrams that are used for similar parts in the apparatus shown at Fig. 4.

The diagram at Fig. 1 is illustrative of my invention. C is a jet-trap water-closet, T is the supply-cistern, and S and S' are, respectively, the long and short arms of the siphon. The normal water-level in the cistern is, as shown, above the crown of the siphon, and the proportions of the several parts and the supply of water should be such that the water-pressure in the cistern upon the air confined within the siphon will be substantially equal to the resistance of the water in the trapped closet to the confined air at the other end of the siphon when the water in the trapped closet stands at the level of the overflow of the trap or at some desired point above the level of the dip. If then the level of the water in the closet is gradually reduced, the pressure or resistance at the lower end of the column of compressed air in the siphon will be less than the pressure at the top of the column, and water will gradually flow over the bend of the siphon and trickle down into the closet until the equilibrium is substantially restored.

To flush the closet with the apparatus thus far described, suddenly pour a large quantity of water into the cistern, thus forcing some of the air out of the siphon and starting the siphonage; and after thus flushing the closet, to restore the original conditions water must be gradually supplied to the cistern until the desired level is reached. If no water, by after flushing or otherwise, has remained in the trap, the subsequent supplying of water into the cistern must be very gradual, that sufficient water may trickle over the level of the siphon to form a resistance in the trap without starting siphonage. Provision, however, may be made, as hereinafter set forth, to retain in the closet after flushing a sufficient quantity of water to form the resistance at the lower end of the siphon, and in this case, as will be seen, the air within the siphon after flushing is gradually compressed as the cistern fills from the main or outside supply. In Fig. 1, however, a more convenient means for supplying water and flushing the closet is shown. P is a pipe for bringing water under pressure into the cistern. A is a cock in said pipe, and B is a ball or float controlling said cock, being connected thereto by stem *e*. V is a valve for the siphon. It is lifted from its seat by the cord *c c'* and lever G, or by any suitable mechanism, and falls by gravity or by the suction of falling water.

The float B and cock A are so adjusted as to keep the water in the cistern at the level at which it will substantially balance the water in the trapped closet, as previously described. The closet is flushed by opening the valve V and suddenly letting a large amount of water into the siphon, thus starting siphonage. The short arm of the siphon is provided with a hole *a*, the purpose of which is to allow the siphon after the closet has been flushed to refill with air at the normal atmospheric pressure before fresh water from the pipe A can effectively reclose the mouth of the siphon.

The long arm of the siphon has communication with the short arm beneath the level of the bend of the siphon by means of a narrow slot $b$, the purpose of which is to let a small quantity of water flow across from the short to the long arm of the siphon and trickle down into the closet, and thus gradually restore the equilibrium between the water in the closet and the water in the cistern without exciting the siphonage of supply when the water in the closet has suddenly been lowered by siphonage on the closet-trap from outside sources. The capacity of the slot $b$ is very much less than that of the siphon connecting the cistern and water-closet, in order that this restoration may be gradual. The narrow passage-way between the two arms of the siphon may be in the form of a pipe, as shown at Fig. 2.

The water-closet in the diagram, at Fig. 1, is shown with a trap-filling chamber $C'$ to furnish the trap with water after flushing.

In the diagram, at Fig. 3, a different form of siphon is shown. $S^5$ is a bell placed over the upper end of the pipe $S^4$, leading from the cistern T to the closet. The pipe and bell thus arranged form a siphon. The hole $a$ and slot $b$ correspond to hole $a$ and slot $b$ of Fig. 1.

The modification shown at Fig. 3 differs from the perfected apparatus hereinafter described in making no use of the air confined in the siphon to raise the bell, On the contrary, the bell is weighted to resist the pressure of the confined air, and is lifted by a lever and cord, as shown. When the bell is lifted, the confined air expands and siphonage is started.

In the perfected apparatus shown at Fig. 4 C is the water-closet. T is the supply-cistern. $S^3$ is the bell of the siphon and is movable, as will presently appear. $S^2$ is the long arm of the siphon or the pipe leading from cistern to closet. P is the supply-pipe. A is the ball-cock therein. B is the float connected to the ball-cock A by a stem $e$. D is a catch or lock for the bell $S^3$ of the siphon, consisting in detail of a weighted arm $d$, secured to a rock-shaft $t$, having bearings at the sides of the cistern, as shown, and a second arm $d'$, projecting from the said rock-shaft at an angle to said weighted arm $d$, which arm $d$ is directly over the center of the bell. L is a lever operated by pull-cord $c$, as shown, its free end in its upward movement striking against the arm $d'$ of lock D and rocking the shaft $t$ to release the bell $S^3$ from the weighted arm $d$. The free end of the lever L is provided with a trip-piece $g$ to strike rigidly against the lock in the upward movement of the lever, but to yield in the downward movement of the lever, whereby the catch may return to its position independent of the length of time during which the end of the lever L is elevated. When the bell $S^3$ is released from the arm $d$ of the lock D, it rises by force of the compressed air beneath it. It returns to its position by the suction of the falling water aided by gravity. The slot $b$ serves the purpose of the slot $b$ in the diagrams already described. W is a pressure-valve in the ball-cock A. It is controlled, as shown, Fig. 7, by the float B and float-stem $e$, the latter being pivoted at $e'$. When the float is up, the valve W closes the passage $P'$, leading from main pipe P to the cistern T. The float-stem $e$ is furnished with a curtain or auxiliary valve $W'$, which when the float is down obstructs to a great extent the flow of water into the cistern, the purpose of the obstruction being that siphonage from cistern T to closet C may entirely cease after a flushing of the latter for want of water in the cistern. The float-stem has also an upper fan $y$ to prevent the water from being propelled upward out of the cistern when the float is down. $D'$ is an arm pivoted to the lever L. It carries upon its side the boss or projection $l$, which when the arm D hangs perpendicular comes directly beneath the stop or projection J, projecting from the inner wall of the tank. The arm $D'$ carries also at its free end another boss or projection $l'$, against which the ball-stem $e$ strikes when the water rises to a certain predetermined position in the cistern in such manner as to move the boss $l$ from beneath the stop J. It follows that the closet can be flushed by pulling upon a cord $c$ only when the water in the cistern stands at a desired height, for when the water is below that height the boss $l$ is at a dead-point. E is a thimble fixed in the upper end of the pipe $S^2$ within the movable bell $S^3$. It is closed at the upper end, but is provided, as shown, with a guide-socket $p$, passing through its closed top for a guide-rod $r$, attached to the movable bell $S^3$. The guide-rod is hollow, and is provided with holes $h\ h$ near its upper end, where it is attached to the bell above the thimble to afford a relief by expansion as the bell rises to compress air that might otherwise be drawn down in the pipe $S^2$. It is of advantage to extend the rod $r$ well down the pipe $S^2$ if the setting up of the apparatus by the plumber permits. When the bell $S^3$ in rising approaches its uppermost position, bubbles of air are seen to escape from under the lower rim of the bell and rise to the surface of the water. K is a small siphon within the larger siphon already described. Its office is to fill the trap of the closet after the large siphonage of the cistern has ceased. It also serves the office of the hole $a$ in apparatus already described, but is itself provided with a similar hole $a^2$ for a similar purpose. With the construction of Fig. 4, moreover, the short arm of the siphon (the principal siphon) may be made shorter than it otherwise could be without lessening the supply of water furnished the closet and with considerable diminution of the friction of the flowing water. The siphon K must be very much smaller in capacity than the large siphon, in order to accomplish its purpose. It must, however, be of greater capacity than cock A, as modified by the auxiliary valve W′, when the water in the cistern is low. Its short arm opens into the cistern at a lower level than the short arm of the larger siphon.

The apparatus shown in Fig. 5 differs from the apparatus of the other figures in having no provision for confining air within the bend of the siphon, and the figure merely illustrates so much of the invention as provides for the establishment of a solid column of water between the cistern and trap during the flushing operation. A valve $v^4$ allows the air within the siphon to escape, thereby relieving its pressure whenever its pressure is greater than that of the atmosphere, and the ball-cock and float are so adjusted that water is not admitted to the cistern in sufficient quantity to start siphonage before the valve for that purpose is lifted.

It follows from the construction last described that in the normal condition of the apparatus a column of compressed air is held between the water in the closet and trap and the water in the cistern, and that the two said bodies of water are in substantial equilibrium, and that when the amount of water in the closet and trap is gradually diminished by evaporation or other accidental cause water will gradually trickle from the cistern to the trap to restore the equilibrium, and thus maintain the seal, and yet the body of water in the closet and trap at the lower end of the siphon is so large, since the siphon enters at the bottom of the trap and closet, that it cannot be drawn down to start siphonage from the cistern by an extraneous siphonage from the closet, such as is often produced by the sudden flow of large amounts of water through pipes of other systems with which the trap connects.

I claim—

1. The combination, with a jet-trap water-closet, of a supply-cistern and a siphon-connection between the two, the said siphon being provided at its crown with an air-relief and the short arm thereof opening into said supply-cistern near the bottom, while the long arm near its lower end bends upward and enters the trap of the closet in the direction of the upcast limb of the trap, substantially as described.

2. A trapped water-closet provided with a supply-cistern and connected therewith by a siphon having a narrow passage-way between its two arms near its crown, and having the mouth of the short arm near the bottom of said cistern, while its long arm opens into said closet below the required level of the water in the trap thereof, substantially as described.

3. The combination of the jet-trap water-closet C, supply-cistern T, pipe $S^2$, and movable bell $S^3$, the said pipe $S^2$ entering said closet below the level of the water therein, substantially as described.

4. The combination of the supply-cistern T, pipe $S^2$, movable bell $S^3$, and lock D, the said pipe $S^2$ being provided with a water-seal at the bottom thereof, substantially as described.

5. The combination, with the cistern T, supply-pipe P, cock A in said supply-pipe, float B, and stem $e$ between said float and cock, of stop J, operating-lever L, and arm $d'$, pivoted to and hanging from said operating-lever and riding on said stem, and provided with projection $l$, passing under said stop J, substantially as described.

6. The combination, with a trapped water-closet, a supply-cistern, a siphon-connection between the two, substantially as described, a supply-pipe for said cistern, a ball-cock in said supply-pipe, a float in said cistern, and a float-stem connecting said ball-cock and float, of a secondary valve or curtain attached to said stem at the inlet of said supply-pipe and adapted to throttle said inlet when said float falls, substantially as described.

7. The combination, with the cistern T, supply-pipe P, cock A in said supply-pipe, float B in said cistern, and stem $e$ between said cock and float, of the auxiliary valve or curtain W′, connected to and controlled by said stem $e$ at the inlet to said cistern from said supply-pipe, substantially as described.

8. The combination of the ball-cock A, float B, float-stem $e$ between said cock and float, and fan $y$, projecting from said stem over said cock, substantially as described.

9. The combination, with the cistern T, pipe $S^2$, and bell $S^3$, the said pipe and bell forming the long and short arm of a siphon for said cistern, and the said long arm being provided with a water seal at its lower end, of the thimble E within said pipe and bell and opening into the former, substantially as described.

10. The combination, with the cistern T, pipe $S^2$, movable bell $S^3$, the said pipe and said bell forming a telescopic siphon for said cistern, and thimble fixed in said pipe $S^2$, of the guide-socket $p$ through the middle of said thimble, and the hollow rod $r$ in said socket attached to said bell and provided with hole $h$, substantially as described.

11. The combination, with the telescopic siphon, of the lock D, normally closed upon the movable portion of said siphon, and the operating-lever L, substantially as described.

12. The combination, with the telescopic siphon, of the lock D, normally closed upon the movable portion of said siphon, and the operating-lever L, provided with trip-piece $g$, substantially as described.

J. PICKERING PUTNAM.

Witnesses:
WM. S. ROGERS,
EDW. B. STRATTON.